United States Patent [19]
Raines

[11] Patent Number: 5,255,424
[45] Date of Patent: Oct. 26, 1993

[54] MANUFACTURE OF A HEAVY DUTY ELASTOMERIC BEARING

[75] Inventor: Kenneth W. J. Raines, Whetstone, England

[73] Assignee: Dunlop Limited, United Kingdom

[21] Appl. No.: 735,036

[22] Filed: Jul. 24, 1991

[30] Foreign Application Priority Data

Jul. 28, 1990 [GB] United Kingdom ............... 9016633

[51] Int. Cl.⁵ ............................................. B32B 31/00
[52] U.S. Cl. ................................... 29/527.3; 29/423; 29/460; 29/898; 264/278
[58] Field of Search .............. 29/423, 424, 458, 460, 29/527.1, 527.2, 527.3, 898, 898.01, 898.12, 898.15; 264/58, 277, 278; 425/501, 502

[56] References Cited

U.S. PATENT DOCUMENTS

| | | | |
|---|---|---|---|
| 1,917,929 | 7/1933 | Duffy . | |
| 2,990,441 | 6/1961 | Marsal | 264/277 |
| 4,455,274 | 6/1984 | Horney | 264/277 X |
| 4,798,695 | 1/1989 | Redel | 264/277 X |

FOREIGN PATENT DOCUMENTS

| | | |
|---|---|---|
| 738639 | 7/1966 | Canada . |
| 0073661 | 3/1983 | European Pat. Off. . |
| 2817953 | 8/1979 | Fed. Rep. of Germany . |
| 883436 | 11/1961 | United Kingdom . |
| 1573470 | 8/1980 | United Kingdom . |
| 2105437 | 3/1983 | United Kingdom . |
| 2190970 | 12/1987 | United Kingdom . |

*Primary Examiner*—Irene Cuda
*Assistant Examiner*—S. Thomas Hughes
*Attorney, Agent, or Firm*—Stevens, Davis, Miller & Mosher

[57] ABSTRACT

For the manufacture of a heavy duty elastomeric having a stack of elastomeric and metal reinforcing layers interleaved with one another use is made of a mould sufficiently large to allow an elastomeric cover layer to be formed and cured simultaneous with compression and cure of the elastomeric layers. Relative transverse movement of the metal layers during compression is restricted by spacers which occupy in the mould a small part of the space that in the finished product is to be occupied by the cover layer. Subsequent to moulding and cure the spacers are removed and the resulting spaces in the part formed cover are filled.

19 Claims, 4 Drawing Sheets

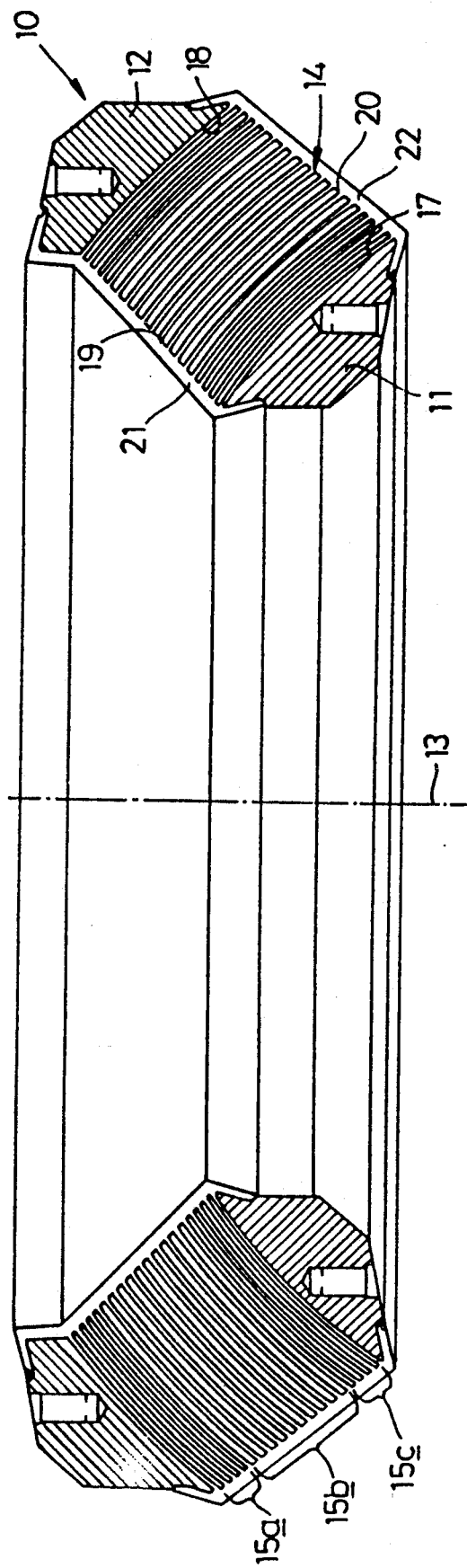
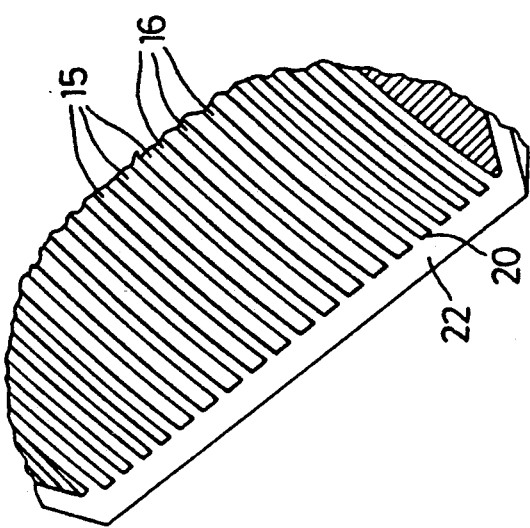

MANUFACTURE OF A HEAVY DUTY ELASTOMERIC BEARING

BACKGROUND OF THE INVENTION

This invention relates to a method for the manufacture of a heavy duty elastomeric bearing of the kind comprising a sandwich arrangement of layers of elastomeric material interposed by metal reinforcing layers and in which the metal layers are protected from the operating environment of the bearing during subsequent use by a cover layer of flexible material which extends over the otherwise exposed edges of the metal reinforcing layers.

One established construction of a heavy duty elastomeric bearing is described in the specification of GB-A-2190970 and comprises a stack of a plurality of superimposed metal reinforcing layers each of part-spherical shape and spaced from one another by intervening layers of rubber. The rubber and metal layers are each of an annular form and the assembly of said layers lies sandwiched between and bonded to inner and outer, generally axially spaced, rigid annular end members whereby the resultant elastomeric bearing is suitable for example for securing a vertically extending pipeline to structure on the seabed and to permit relative conical movement therebetween as also described in GB-A-2190970. The radially inner and outer edges of the metal reinforcing layers are covered by layers of protective elastomeric material so that fluid flowing through the pipeline cannot come into direct contact with radially outer edges of the metal layers and so that the surrounding sea environment cannot contact radially inner edges of the metal layers.

The fatigue strength of a heavy duty elastomeric bearing such as of the kind described in the preceding paragraph is dependent on a number of factors including the thickness of the respective rubber layers between the metal layers and between the metal reinforcing layers at each end of the stack and said inner and outer rigid members. If the thickness of a layer of elastomeric material departs significantly from the intended design thickness, for example if the thickness varies in any one layer at different points around the circumference of that layer, the fatigue life of the bearing is adversely affected.

Although in manufacture of the bearing the thickness of elastomeric material provided between successive metal reinforcing layers may be accurately controlled during a building process in which the successive metal and elastomeric layers are applied about a former, it is found that during subsequent vulcanization under the action of heat and pressure the thickness of the elastomeric layers can vary in an unpredictable manner to result in an adverse effect on potential fatigue life of the bearing.

SUMMARY OF THE INVENTION

The present invention seeks to provide a method for the manufacture of a heavy duty elastomeric bearing of the kind comprising a sandwich arrangement of elastomeric and metal reinforcing layers in which random variation of the thickness of an elastomeric layer or part thereof during cure of the elastomeric bearing is minimized.

In accordance with one of its aspects the present invention provides a method for the manufacture of a heavy duty elastomeric bearing of the kind comprising a sandwich arrangement of interposed elastomeric and metal reinforcing layers wherein the elastomeric material is subject to cure in a mould having a cavity sufficiently large to enable simultaneous moulding and cure of the interleaved elastomeric reinforcing layers as well as a cover layer for covering otherwise exposed edges of said elastomeric and metal reinforcing layers, the assembly of layers is subject to compression during curing of the elastomeric material to result in compression of each of the elastomeric layers between successive pairs of metal reinforcing layers and means is provided in a part of the space between said mould and said exposed edges to restrain relative transverse movement of successive metal layers while the interposed elastomeric material is subject to heat and pressure during cure.

It is provided by the present invention that use may be made of a plurality of spacer means arranged each to occupy in the mould a small part of the space that in the finished product is to be occupied by cover layer material, the spacer means being positioned and dimensioned such that at least when the mould is in a closed position they are each capable of contacting a part of the length of an exposed edge of each metal reinforcing layer in a manner otherwise corresponding to that in which the aforementioned face region of a first mould is able to contact said exposed edges. Subsequent to removal of the elastomeric bearing and partially complete cover layer from the mould, and including removal of the spacer means from proximity with the partly-formed cover, the spaces left in the cover region by the spacer means are filled with a suitable compound such as a low temperature curing compound. The spacer means may be permanently attached to the mould or only loosely attached thereto or to the elastomeric bearing for initial assembly of the mould and elastomeric bearing components prior to compression and cure. In the latter case the pre-cured elastomeric bearing may be returned to the mould, without the spacers, for cure of additional material provided in the spaces of the cover layer region.

Means may be provided to restrain flow of elastomeric material from between one successive pair of reinforcing layers to between another pair of reinforcing layers while the elastomeric material is subject to heat and pressure during cure.

The invention is based upon the finding that by preventing relative transverse movement of the metal reinforcing layers there is achieved a substantial reduction or elimination of random variation of the thickness of the interposed elastomeric material.

Cure of an elastomeric bearing of an annular type may be performed using a mould having a face region which is arranged to be capable of contacting substantially the whole of the length of an exposed edge of each metal reinforcing layer at least when the mould is in a closed position in the case of exposed edges which are not of identical shape and dimension. In the case of a simple stack of interleaving metal and elastomeric layers in which all of the metal layers are of identical shape the exposed edges of those layers will lie aligned with one another as viewed in the direction of compressive loading of the interposed layers during cure and a mould face region will be proximate and able to contact those edges during all stages of mould closure. In contrast, if the interleaving metal layers are not of corresponding dimensions but have edges which vary for example progressively from a small to a large diameter then it will be necessary to use a mould having a face region which lies inclined relative to said direction of compressive loading for cure and in that case a face region of the mould will be proximate each of said edge regions for contact therewith only during the final stages of mould closure. Although the mould may have a face region arranged to be capable of contacting substantially the whole of the length of an exposed edge of each metal reinforcing layer it will be appreciated that the extent to which an exposed edge actually contacts a mould face region will depend upon manufacturing tolerances for the dimensions of the reinforcing layers and on the actual relative transverse movement which respective layers seek to undergo during closure of the mould.

For an annular type elastomeric bearing to be provided with a protective cover layer of flexible material over the exposed edges of the metal reinforcing layers and also the elastomeric layers, and for that cover to be of a curable material bonded to the exposed edge surfaces under the action of heat and pressure, that bonding may be achieved using a second mould which defines a cavity larger than that of the mould used during initial compression and cure of the elastomeric bearing whereby material for the cover layer may be accommodated within the second mould and be caused to form a cover layer bonded to said exposed edges.

To avoid provision of separate first and second moulds, a liner sleeve may be provided for insertion in the second mould to reduce the volume of the mould cavity whereby that mould may be used also as the first mould for initial compression and cure of the interleaved stack of metal and elastomeric layers.

The invention further teaches that preferably use is made of spacer means each comprising a pair of elements, typically elongate elements and each of a length corresponding to the total thickness of the exposed edges of the metal and elastomeric layers when the mould is in a fully closed position. More preferably a pair of spacer elements are arranged one to lie with one end thereof substantially adjacent one of the outer metal reinforcing layers of the stack and the other spacer element with an end thereof adjacent the other of the outer metal reinforcing layers. The spacer elements may be arranged in a sideby-side configuration to be slidable one relative to the other during closure of the mould. The use of spacer elements which are shorter than the initial thickness of the exposed edge of a stack of metal and elastomeric layers prior to compression thereof is found to be particularly advantageous where the stack of metal and elastomeric layers are moulded and compressed in situ between a pair of rigid end members and overhang the exposed edges. By virtue of that overhang the use of spacer elements of a length corresponding to the uncompressed thickness of the exposed edges is not possible and the use of the single spacers of a length less than the initial thickness is considered unsatisfactory because of the risk of an end of the spacer coming into abutment against a transversely shifted face portion of a metal reinforcing layer rather than sliding over the edge of that layer to provide resistance to transverse movement; the provision of pairs of spacer elements and in particular pairs arranged in a side-by-side configuration to slide one relative to the other during mould closure avoids this potential problem.

The elements of a pair may have interengaging edge formations whereby they are relatively slidable but are restrained from separation in a transverse direction.

To provide resistance to relative transverse movement in any direction during mould closure preferably, in the case of circular reinforcing layers, three or more spacer means, e g pairs of spacer elements, are provided. If, however, the metal reinforcing layers are of a rectangular shape it will be appreciated that four or more spacer means, e g pairs of spacer elements, should be provided. Preferably method of manufacture employs only the minimum number of spacer means necessary to restrain relative transverse movement in any direction thereby to minimized the subsequent number of cover region sites at which additional cover material needs to be provided to complete the cover layer.

Preferably the spacer means have a radial thickness slightly less than the radial thickness of a cover layer when the mould is in a fully closed condition whereby a thin protective skin of elastomer tends to form between the edge of each metal reinforcing layer and at least some of the spacer means.

The spacer means, or at least a surface thereof for sliding over edges of the metal interleaves, preferably is formed of a material which is of a lower hardness than that of the metal interleaves thereby to avoid any undue scoring or other damage to edges of the interleaves during relative sliding movement. Suitable materials include aluminum and brass; the material chosen should be non invasive by which is meant that even when subject to conditions in the mould it does not generate any vapors or leave any residue that might, for example, cause a surface contamination that affects the bond capability of the elastomeric material.

To facilitate assembly of the mould and the elastomeric bearing components to be subject to cure the spacer means may be secured to a mould face or face of the components to be cured by means of a low strength adhesive which during subsequent closure of the mould does not inhibit any required movement of the spacer means. Subsequent to initial movement, and when the adhesive ceases to have effect, cover layer material may act to generally maintain the spacer means in the desired orientation.

The method of the invention is particularly applicable to manufacture of elastomeric bearings of an annular type and in that case means spacer means may be provided at both radially inner and radially outer exposed edges of metal reinforcing layers to control relative movement of those layers.

BRIEF DESCRIPTION OF THE DRAWINGS

Embodiments of the present invention will now be described, by way of example only, with reference to the accompanying diagrammatic drawings in which:

FIG. 1 is a longitudinal sectional view of an annular heavy duty elastomeric bearing which may be manufactured by the method of the present invention;

DETAILED DESCRIPTION OF A PREFERRED EMBODIMENT

Figure 2:
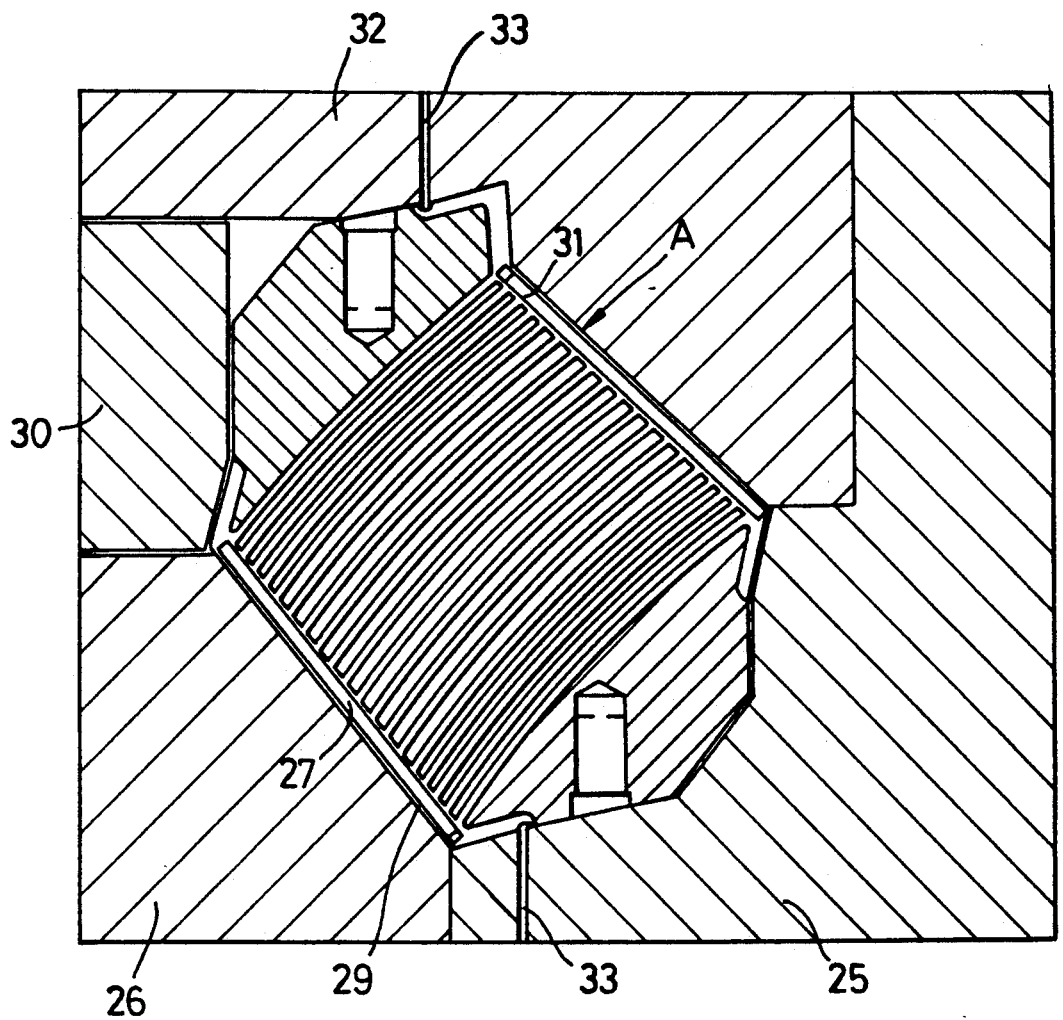
FIG. 2 is a longitudinal sectional view of a left-hand region of the elastomeric bearing of FIG. 1 when in situ in mould with the mould in a fully closed condition.

A heavy duty elastomeric bearing 10 of a kind which may be manufactured by the method of the present invention is shown in FIG. 1 and comprises a pair of inner and outer rigid end members 11,12, of a kind known in the art as inner and outer bulk metals, and which are axially spaced in the longitudinal axis 13 of the bearing by an interposed stack 14 of interleaving metal and rubber reinforcing layers (15,16). The interposed stack is bonded to the confronting surfaces 17,18 of the inner and outer rigid members, those confronting surfaces and also each of the constituent layers of the stack being of a part-spherical annular form and having a common centre of curvature which lies on the longitudinal axis of the bearing. The inner surface 18 of the outer rigid member 12 is concave and the confronting surface 17 of the inner rigid member is convex.

In the illustrated elastomeric bearing it will be seen that the successive rubber layers 16 are of a uniform thickness but that the metal layers 15 are arranged in groups of layers (15a,15b,15c) of different thicknesses. This feature is the subject of our copending U K Patent Application No. 9012278.9 and although, as will be apparent from the following description, the present invention is of particular benefit in avoiding damage to relatively thin metal reinforcing layers lying at each end of a stack of layers the method of the invention is applicable equally to other bearing constructions including notably those in which all metal layers are of a corresponding thickness.

The generally radially inwardly 19 and radially outwardly 20 facing surfaces of the stack of interposed rubber and metal layers are provided with cover layers (21,22) of rubber the same as that rubber forming the interleaved rubber layers 16 and which serve to provide a protective cover for the edges of the interleaved layers that would otherwise be exposed to the surrounding environment of the bearing.

Prior to insertion in a mould the constituent components of the elastomeric bearing are assembled by a hand build technique.

The inner rigid end member 11 is located on a mould core 25 (see FIG. 2) and successive metal and rubber layers for the interposed stack 14 of layers 15,16 are then applied to the annular part-spherical surface 17 of the inner rigid member.

Figure 5:
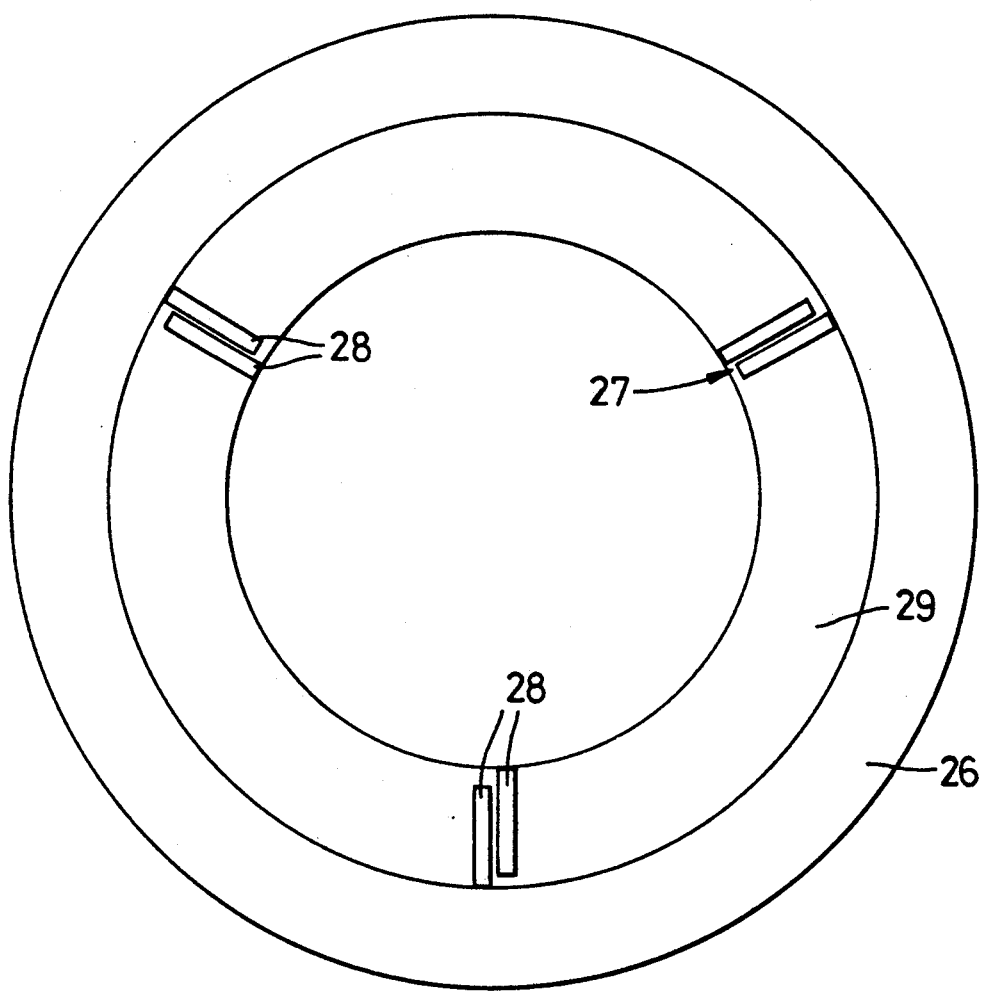
FIG. 5 is a plan view of the mould, part removed, to show the location of spacer bars.

Before positioning the mould core 25 and part assembly of the elastomeric bearing in an annular mould body 26 three pairs 27 of spacer bars 29 (FIG. 5) are secured to a frusto-conical shaped mould face 29 by means of a low duty adhesive, that mould face 29 being one which confronts the radially outer edge face 20 of the stack of rubber and metal layers. Three pairs of spacer elements are provided and arranged at substantially uniformly circumferentially spaced positions and to extend over the inclined frusto-conical surface 29 to lie otherwise generally parallel with the longitudinal axis 13 of the elastomeric bearing (see FIG. 5). The pairs 27 of spacer elements 28 are arranged initially in an offset manner whereby when the uncompressed bearing assembly is located within the mould body 26 metal reinforcing layers 15 at one end region of the stack of layers are proximate one of the spacer bars and those layers of the other end of the stack are proximate the other spacer bar of the pair, intervening metal layers being proximate each of the spacer bars.

Rubber compound for forming the protective outer skin or cover 22 of the elastomeric bearing is then applied by hand to the mould face 29 to lie between the spacer bars. The mould core 25 and part-formed elastomeric bearing of the assembly is then lowered into the mould body, the outer rigid member 12 of the bearing is fitted to the top of the stack of metal and rubber layers and an outer mould ring 30 is then placed around the outer rigid member 12 and to locate with an upper surface of the mould body 26.

Figure 3:
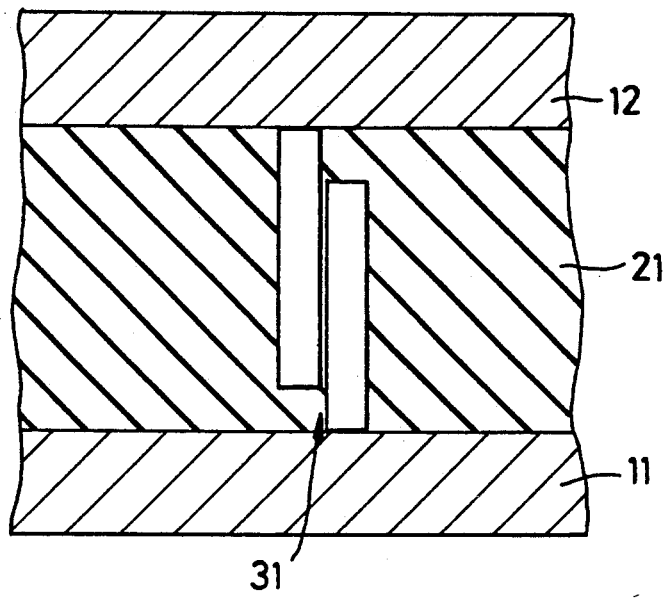
FIG. 3 is a side edge view in the direction of the arrow A of FIG. 2 of part of the edge of the elastomeric bearing when in the mould prior to closure of the mould.

Three pairs 31 of offset spacer elements are then secured with low duty adhesive to the radially inner face 19 of the stack of layers in substantially the same manner as that in which the aforedescribed three pairs 27 of spacer elements 28 were secured to the face 29 of the mould body (see FIG. 3). Rubber compound for forming an inner protective skin is then applied by hand to the radially inner face 19 of the stack of layers, to lie between the pairs of spacer bars. A mould lid 32 is then lowered into contact with the mould ring and would core and subsequently subject to compression while the mould is heated in a conventional manner to cure the elastomeric material of rubber layers 16 and radially inner and outer covers 21,22. Excess rubber flows through sprues 33.

Upon completion of the cure cycle the mould lid 32 is removed and the elastomeric bearing is then extracted from the mould. The pairs 27, 31 of spacer bars are then removed, if still adhering to the cover material, and the spaces left in the cover material are prepared for a secondary cure and moulding cycle by first cleaning, applying a suitable adhesive agent and then applying a filler compound. The elastomeric bearing assembly is then returned to the mould, without presence of any of the spacer elements and subject to a secondary cure cycle to effect cure of the filler compound.

During closure of the mould prior to the main cure cycle the spacer bars of each pair will be caused to slide relative to one another by virtue of their respective abutment with parts of the mould in the case of the pairs 27 spacer bars pre-adhered to the mould body face 29 or between part 25 of the mould and outer rigid member 12 in the case of spacer bars pre-adhered to the inner face 19 of the stack of rubber layers.

Figure 4:
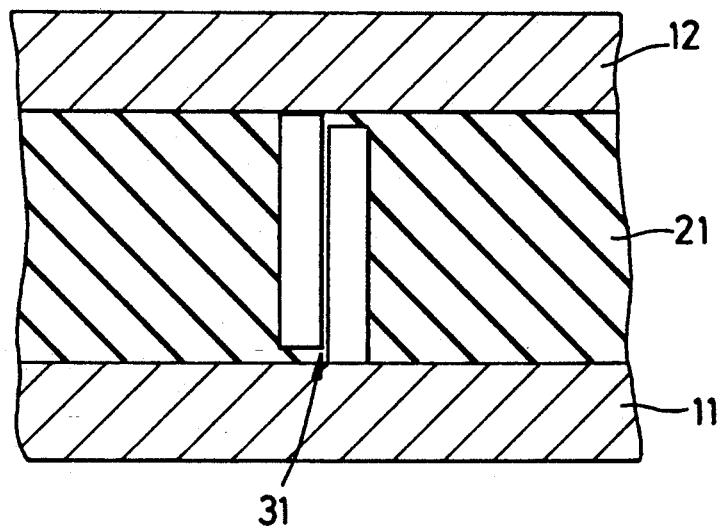
FIG. 4 corresponds to FIG. 3 but shows the mould in a closed condition.

When the mould is in a fully closed condition the spacer bars of the pairs 31 will adopt a configuration as shown in FIG. 4. Because all successive metal layers 15 of the stack are at all times restrained from excessive transverse relative movement by at least one of the spacer bars of each pair there is avoided any risk of one of the spacer bars abutting and potentially damaging a transversely displaced metal layer during closure of the mould.

During the initial stages of mould closure the upper ends of the outer spacer bars will lie slightly spaced from the metal layers a greater distance than the spacing between those bars and the lower metal layers due to the initial orientation of the inner and outer rigid members which are axially spaced by a distance greater than that when the bearing has been fully compressed upon closure of the mould. However, during the initial phase of mould closure the inner spacer bars will serve to provide accurate relative location of the upper metal layers. Conversely the lower ends of the outer spacer bars will provide effective relative location of the lower metal layers. When the mould approaches a fully closed condition each of the inner and outer pairs of spacer bars will serve to ensure desired transverse alignment of the respective metal layers.

In a second embodiment of the present invention the elastomeric bearing of FIG. 1 is manufactured using the mould of FIG. 2 but without the aforedescribed pair of spacer bars at the inner face 19.

The surface of the mould lid 32 which confronts the inner face 19 of the stack of layers is provided with an annular liner layer which occupies the space in the mould which normally would be occupied by the spacer bars and cover layer compound at the inner face 19. The mould with the liner layer in situ is then used to cure the elastomeric bearing in the same manner as in the first embodiment but without the use of spacer bars at the inner face 19. In this stage of manufacture the mould liner layer performs the same function as the spacer bars in also restraining undue relative transverse movement of successive metal reinforcing layers and of ensuring that an acceptable degree of alignment of the metal layers results when the mould is in a fully closed condition.

The mould lid 32 is then removed from the mould and the part-formed bearing assembly and the mould liner layer is also removed. Curable compound for the inner cover 21 is positioned on the inner edge 19 of the stack of interleaved metal and rubber layers and in spaces in the outer cover resulting from removal of spacer bars and then the mould lid 32 is replaced. The mould is then closed to compress the bearing assembly and cover compound and apply sufficient heat to cure the cover compound. Preferably the inner cover compound is a low temperature cure compound so as readily to avoid any risk of over cure of the rubber layers of the interleaved stack. The resulting bearing assembly is then removed from the mould.

What I claim is:

1. Method for the manufacture of a heavy duty elastomeric bearing of the kind comprising a plurality of elastomeric layers and a plurality of metal reinforcing layers arranged interposed with one another in a sandwich arrangement of alternating elastomeric and metal reinforcing layers and in which exposed edges of said metal layers are covered by a cover layer of curable material, said method comprising:

positioning said alternating layers in a mould having a cavity sufficiently large to enable moulding and cure of the elastomeric layers to occur simultaneously with moulding and cure of said cover layer of curable material;

covering said edges of said metal layers with said cover layer of curable material;

restraining relative transverse movement of successive metal layers by providing restraining means in a part of a space between said mould and said edges; and curing said cover layer of curable material while compressing said alternating layers to result in compression of each of the elastomeric layers lying between successive metal reinforcing layers.

2. Method according to claim 1 including restraining flow of elastomeric material from between one successive pair of reinforcing layers to between another pair of reinforcing layers while the elastomeric material is subject to heat and pressure during cure.

3. Method according to claim 1 wherein the elastomeric bearing is of annular form and wherein the restraining step includes positioning said means for restraining relative transverse movement of successive metal layers so as to cooperate with radially outer edges of those layers.

4. Method according to claim 1 wherein the restraining step includes arranging a plurality of spacer means each to occupy in the mould a small part of the space that in the finished product is to be occupied by cover layer material.

5. Method according to claim 4 including positioning and dimensioning said spacer means such that at least when the mould is in a closed position the spacer means are each capable of contacting a part of an exposed edge of each metal reinforcing layer.

6. Method according to claim 1 including removing the restraining means from proximity with the cover layer to create spaces in the cover region and filling said spaces with a compound.

7. Method according to claim 1 wherein the restraining step includes permanently attaching spacer means to the mould.

8. Method according to claim 1 wherein the restraining step includes loosely attaching spacer means to one of the mould and elastomeric bearing components prior to compression and cure.

9. Method according to claim 1 wherein the restraining step includes arranging spacer means comprising a pair of spacer elements initially in a longitudinally offset manner and in a side-by-side configuration to be slidable one relative to the other and subsequently closing the mould.

10. Method according to claim 9 including using spacer elements of an elongate form.

11. Method according to claim 10 including using elongate spacer elements which are of a length shorter than the initial thickness of an exposed edge of a stack of metal and elastomeric layers prior to compression thereof.

12. Method according to claim 1 wherein the restraining step includes forming at least a surface of the spacer means of a material which is of a lower hardness than that of the metal layers.

13. Method according to claim 1 wherein the restraining step includes securing the restraining means to a mould face or to exposed edges of the components to be cured by means of a low strength adhesive which is selected so as not to inhibit subsequent movement of the restraining means during a subsequent closure of the mould.

14. Method according to claim 1 wherein the restraining step includes providing spacer means at both radially inner and radially outer exposed edges of the metal reinforcing layers.

15. Method according to claim 1 wherein the curing step includes curing in a mould having a face region arranged to be capable of contacting substantially the whole of an exposed edge of each metal reinforcing layer at least when the mould is in a closed position.

16. Method according to claim 15 including defining said face region by means of inserting a liner sleeve in a mould of a size sufficient for moulding a cover layer when the sleeve is removed.

17. Method according to claim 1 wherein the elastomeric and metal layers are of part-spherical shape.

18. Method according to claim 1 wherein said restraining step includes selecting and arranging the exposed edges for covering by the cover layer so as to define a surface which lies inclined relative to the direction of compression in the mould.

19. Method for the manufacture of a heavy duty annular elastomeric bearing of the kind comprising a plurality of elastomeric layers and a plurality of metal reinforcing layer arranged interposed with one another in a sandwich arrangement of alternating elastomeric and metal reinforcing layers and in which edges of said metal layers are covered by a cover layer of curable material, said method comprising:

positioning said alternating layers in a mould having a cavity sufficiently large to enable moulding and cure of the elastomeric layers to occur simultaneously with moulding and cure of said cover layer of curable material;

covering said edges of said metal reinforcing layers with said cover layer of curable material;

restraining relative transverse movement of successive metal layers by providing a plurality of spacer means to cooperate with radially outer edges of the metal layers; and curing said cover layer of curable material while compressing and heating the interposed layers of elastomeric material, said spacer means each comprising a pair of elongate elements slidable one relative to the other during a closure of the mould.

* * * * *